Patented Oct. 26, 1926.

1,604,481

UNITED STATES PATENT OFFICE.

ARTHUR B. RAY, OF BAYSIDE, NEW YORK, ASSIGNOR TO CARBIDE AND CARBON CHEMICALS CORPORATION, A CORPORATION OF NEW YORK.

SOLVENT RECOVERY.

No Drawing.　　Application filed November 14, 1924.　Serial No. 750,007.

The invention is a process for recovering valuable substances from vaporous mixtures by the use of activated carbon, and it is applicable in general where the substance to be recovered is a liquid soluble in water. The invention is especially applicable where the substance to be recovered is soluble in water to a limited extent only.

In several industries, and in particular in the manufacture of artificial leather, organic liquids which dissolve in water to a limited extent only are used as solvents, and at one stage of the process are evaporated to deposit the dissolved substance. It has been found that if the vapors of the solvent, which are usually mixed with a large volume of air used to carry off the vapors and thereby promote evaporation, are passed over activated carbon under suitable conditions, the vapors of the solvent will be adsorbed by the activated carbon and can be recovered from it.

One method generally employed for expelling the solvent from the carbon in order to recover the solvent and revivify the carbon is to pass steam through the carbon with or without a simultaneous indirect heating of the carbon, for example by steam coils embedded in it. The carbon is thus heated and liberates the solvent, which is carried away as vapor by the steam. The mixture of steam and vapor then passes to a condenser where it is liquefied, and that portion of the solvent which is insoluble in the aqueous condensate forms a separate layer and is readily recovered. However, all organic liquids dissolve in water to a greater or less extent, and since the aqueous layer from the condensate is usually rejected, a considerable quantity of valuable solvent dissolved in this aqueous layer is lost.

I have invented a process whereby the water-dissolved solvent referred to may be recovered, and in such a way that advantages are obtained in addition to a more complete recovery of the solvent.

I have found that when an aqueous solution of any organic liquid is subjected to the action of activated carbon, the organic liquid is preferentially adsorbed. I therefore treat the aqueous layer of the condensate with activated carbon, producing thereby a concentrate of the solvent in the carbon, from which the solvent may be directly recovered, and an aqueous liquid practically barren of valuable substances. The carbon used for the treatment of the aqueous layer of the condensate is preferably carbon which has been used to adsorb solvent from the vaporous mixture already referred to, and from which adsorbed solvent has been removed by steaming. Since the steaming operation leaves the carbon hot, and since it must be cooled in order effectively to adsorb solvent when the vaporous mixture is again passed through it, the aqueous layer of the condensate may be brought into contact with the carbon while the latter is still hot, whereby the carbon is cooled and the values in the aqueous liquid are simultaneously removed therefrom.

Because of its high specific heat, water has advantages as a medium for cooling the carbon. I have discovered that activated carbon is not made unfit for the separation of vaporous mixtures by being wet, and have disclosed and claimed in my application Serial No. 636,766, filed May 4, 1923, a process based on this discovery. The carbon, which has been cooled by treating it with the aqueous layer of the condensate, may therefore be used for the treatment of the vaporous mixture without intervening drying. A drying step may of course be used if desired.

The invention is applicable to the recovery of a variety of hydrocarbons, ethers, esters, and other compounds. Among those which are soluble in water to a limited extent only, benzene, ethyl ether, amyl acetate and butyl acetate may be mentioned by way of example.

I claim:

1. The process of recovering from vaporous mixtures substances liquid at ordinary temperatures and soluble in water to a limited extent only, which comprises passing the vaporous mixture through activated carbon to adsorb therein the substance to be recovered; passing steam in contact with the carbon to heat the carbon and distil the adsorbed substance therefrom; condensing the distillate to form two liquids containing different concentrations of the substance to be recovered; bringing the liquid of lower concentration into contact with activated carbon to cool the carbon and collect therein the substance to be recovered; and recovering said substance from the carbon.

2. The process of recovering from vaporous mixtures substances liquid at ordinary temperatures and soluble in water to a limited extend only, which comprises passing the vaporous mixture through activated carbon to adsorb therein the substance to be recovered; passing steam in contact with the carbon to heat the carbon and distil the adsorbed substance therefrom; condensing the distillate to form two liquids containing different concentrations of the substance to be recovered; bringing the liquid of lower concentration into contact with activated carbon to cool the carbon and collect therein the substance to be recovered; collecting in the carbon an additional quantity of said substance; and recovering said substance from the carbon.

3. The process of recovering from vaporous mixtures substances liquid at ordinary temperatures and soluble in water to a limited extent only, which comprises passing the vaporous mixture through activated carbon to adsorb therein the substance to be recovered; passing steam in contact with the carbon to heat the carbon and distil the adsorbed substance therefrom; condensing the distillate to form two liquids containing different concentrations of the substance to be recovered; bringing the liquid of lower concentration into contact with activated carbon to cool the carbon and collect therein the substance to be recovered; collecting in the carbon without intervening drying thereof an additional quantity of said substance; and recovering said substance from the carbon.

4. The process of recovering from vaporous mixtures substances liquid at ordinary temperatures and soluble in water to a limited extent only, which comprises passing the vaporous mixture through activated carbon to adsorb therein the substance to be recovered; passing steam in contact with the carbon to heat the carbon and distil the adsorbed substance therefrom; condensing the distillate to form two liquids containing different concentrations of the substance to be recovered; bringing the liquid of lower concentration into contact with activated carbon to cool the carbon and collect therein the substance to be recovered; passing through the carbon an additional quantity of vaporous mixture containing said substance to increase the content thereof in the carbon; and recovering said substance from the carbon.

5. The process of recovering from vaporous mixtures substances liquid at ordinary temperatures and soluble in water to a limited extent only, which comprises passing the vaporous mixture through activated carbon to adsorb therein the substance to be recovered; passing steam in contact with the carbon to heat the carbon and distil the adsorbed substance therefrom; condensing the distillate to form two liquids containing different concentrations of the substance to be recovered; bringing the liquid of lower concentration into contact with activated carbon to cool the carbon and collect therein the substance to be recovered; passing through the carbon without intervening drying thereof an additional quantity of vaporous mixture containing said substance to increase the content thereof in the carbon; and recovering said substance from the carbon.

6. Process of recovering substances liquid at ordinary temperatures of limited solubility in water from vaporous mixtures containing steam, which comprises condensing at least a portion of the mixture, said portion including steam and the substance to be recovered in such proportions that the condensed said substance does not completely dissolve in the water, separating the aqueous layer, and treating it with activated carbon to recover its dissolved content of said substance.

7. Process of recovering substances liquid at ordinary temperatures of limited solubility in water from vaporous mixtures containing steam, which comprises condensing at least a portion of the mixture, said portion including steam and the substance to be recovered in such proportions that the condensed said substance does not completely dissolve in the water, separating the aqueous layer, and treating it with hot activated carbon to recover its dissolved content of said substance and to cool the carbon.

In testimony whereof, I affix my signature.

ARTHUR B. RAY.